US007064786B2

(12) United States Patent
Hill et al.

(10) Patent No.: US 7,064,786 B2
(45) Date of Patent: Jun. 20, 2006

(54) SUBSTRATE ELECTRICAL BOUNCE COMPENSATION CIRCUITRY FOR DIGITAL CINEMATOGRAPHY IMAGE CAPTURE CAMERAS

(75) Inventors: William A. Hill, San Jose, CA (US); Troy Pellizzer, Redwood City, CA (US); Gary Nunes, Hayward, CA (US)

(73) Assignee: Lockheed Martin Corp., Bethesda, MD (US)

( * ) Notice: Subject to any disclaimer, the term of this patent is extended or adjusted under 35 U.S.C. 154(b) by 769 days.

(21) Appl. No.: 10/277,501

(22) Filed: Oct. 22, 2002

(65) Prior Publication Data

US 2004/0080651 A1 Apr. 29, 2004

(51) Int. Cl.
H04N 9/64 (2006.01)

(52) U.S. Cl. .................. 348/250; 348/241; 348/311

(58) Field of Classification Search ............... 348/311, 348/241, 249, 250, 320, 607
See application file for complete search history.

(56) References Cited

U.S. PATENT DOCUMENTS 5,237,422 A * 8/1993 Kannegundla et al. ...... 348/320

OTHER PUBLICATIONS

High Speed Scientific CCDs: Substrate Bounce; Janesick, et al. Pixel Vision; Proc. SPIE 4008 375; 2000.*

* cited by examiner

Primary Examiner—Ngoc-Yen Vu
Assistant Examiner—Gregory V. Madden
(74) Attorney, Agent, or Firm—Kenneth W. Float

(57) ABSTRACT

A charge coupled device (CCD) circuit employing substrate electrical bounce compensation circuitry that is particularly useful in a cinematography digital image capture cameras. An exemplary CCD circuit comprises a CCD array having a substrate that is coupled to an output node. The output of the CCD array (substrate) is coupled to a gate input of a reset field effect transistor (FET). The output node is coupled to a source input of the reset FET. The output of the CCD array is coupled to the substrate bounce compensation circuit which provides a video pedestal reference signal for the reset FET. The substrate bounce compensation circuit includes a capacitor that capacitively coupled the output of the CCD array to the drain of the reset FET, and a resistor that resistively couples the drain of the reset FET to a reset drain bias capacitor. The substrate bounce compensation circuit thus comprises substrate feedback circuitry coupled to the output node that allows the video pedestal to track and thereby suppress substrate bounce generated through a parallel drive signal that would otherwise cause output signal interference at high frame rates.

3 Claims, 4 Drawing Sheets

SUBSTRATE ELECTRICAL BOUNCE COMPENSATION CIRCUITRY FOR DIGITAL CINEMATOGRAPHY IMAGE CAPTURE CAMERAS

BACKGROUND

The present invention relates generally to digital cameras, and more particularly, to a charge coupled device (CCD) array and substrate electrical bounce compensation circuit for use with cinematography digital image capture cameras.

In the past, the general practice and misconception with respect to CCD sensors has been to implement bypassed external electrical ground to the reset node bias within a high frame rate sensor. For concurrent clocking of both parallel and serial registers, prior art for digital cameras established a solid ground reference for the output node bias and/or to limit the harmonic bandwidth of the parallel drive signal.

It would be desirable to eliminate output signal interference caused by the prior art approach, particularly at high frame rates. Therefore, it is an objective of the present invention to provide for a substrate electrical bounce compensation circuitry for use with CCD sensors and cinematography digital image capture cameras.

SUMMARY OF THE INVENTION

To meet the above and other objectives, the present invention provides for substrate electrical bounce compensation circuitry for use with CCD output circuits, and in particular one used in a cinematography digital image capture camera where high frame rates are desired. An exemplary CCD circuit comprises a CCD array having a substrate that is unavoidably but parasitically coupled to an output node through the node capacitance. The output of the CCD array is intentionally coupled through the output to a source of a reset field effect transistor (FET) and generally to an output amplifier. The output node is also parasitically coupled to the substrate through node capacitor.

The output of the CCD array is also coupled to a substrate bounce compensation circuit that provides substrate bounce tracking for the video pedestal reference set by the reset FET. The substrate bounce compensation circuit includes a capacitor that capacitively couples the output of the CCD array to the drain of the reset FET, and a resistor that resistively couples the drain of the reset FET to a reset drain bias supply.

The substrate bounce compensation circuit thus comprises substrate feedback circuitry coupled to the output node that allows the video pedestal to track and thereby suppress substrate bounce generated through a parallel drive signal that would otherwise cause output signal interference at high frame rates.

The novelty of the present compensation circuit is the incorporation of substrate feedback circuitry in the output node bias (video pedestal), allowing both array and serial readout drives to operate concurrently without interference. This provides for higher frame rates and increased video dynamic range. The present compensation circuit thus uses substrate feedback to eliminate or suppress electrical interference on the output signal.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
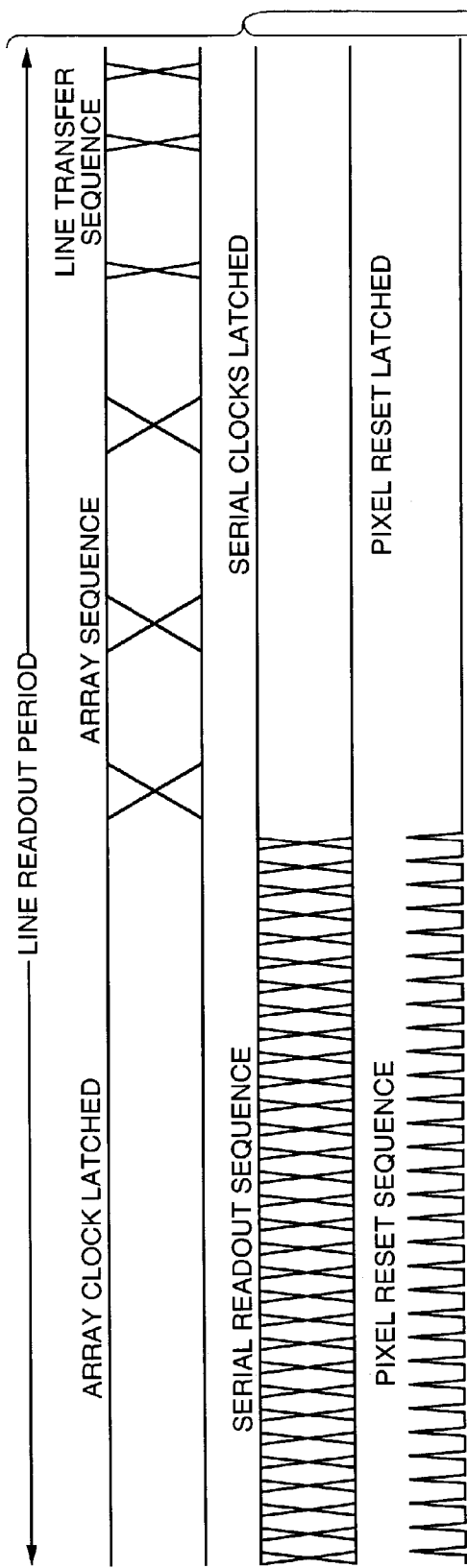
FIGS. 1 and 2 illustrates drive signaling in a CCD circuit of a conventional cinematography digital image capture camera.
Figure 2:
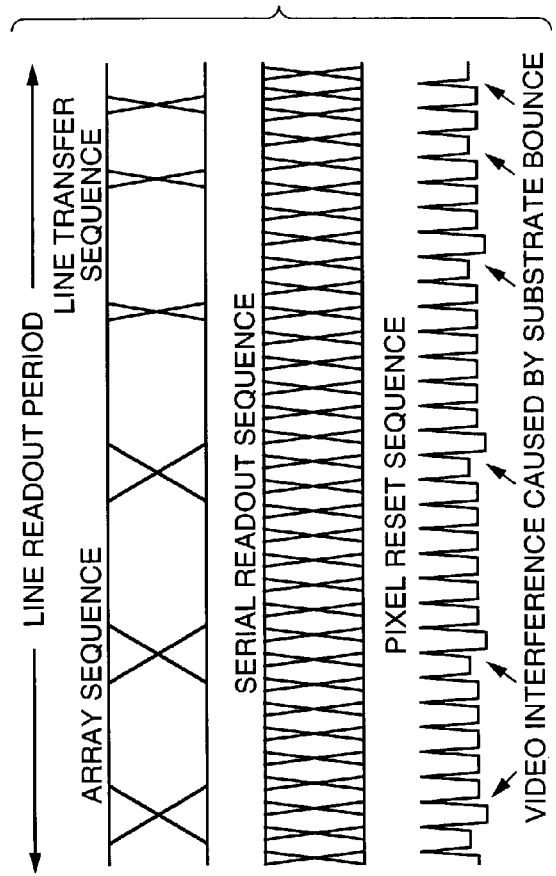

Referring to the drawing figures, FIGS. 1 and 2 illustrate drive signaling in a charge coupled device (CCD) array, or CCD circuit, of a conventional cinematography digital image capture camera. Generally, CCD timing "gates" (or sequences) parallel drive signaling and serial drive signaling (including output node reset) to separate time periods at the line rate in order to avoid electrical interference, as is illustrated in FIG. 1.

This practice limits the readout frame rate of large array sensors that may otherwise be used in cinematography digital image capture cameras and prevents sensor operation at high frame rates. Live action cinematography requires high dynamic range at a minimum of 24 frames per second. Common sensor (CCD array) implementation and signaling practice limits frame rates to less than this "live action" requirement.

Furthermore, simultaneously operating both the parallel drive circuitry and serial drive circuitry during line readout permits higher frame rates, up to and beyond 24 frame per second required for "live action". However, doing so can also cause interference between the parallel signaling and the serial signaling severely lessening video dynamic range as shown in FIG. 2.

This is due to the consequence that the video reset and therefore the video pedestal reference voltage is derived from the serial circuitry and timing and is subject to capacitive interference from the parallel drive circuitry if that drive circuitry is operating at the same time. The path of this interference is through the sensor substrate via parasitic capacitive coupling (commonly referred to as "substrate bounce").

Figure 3:
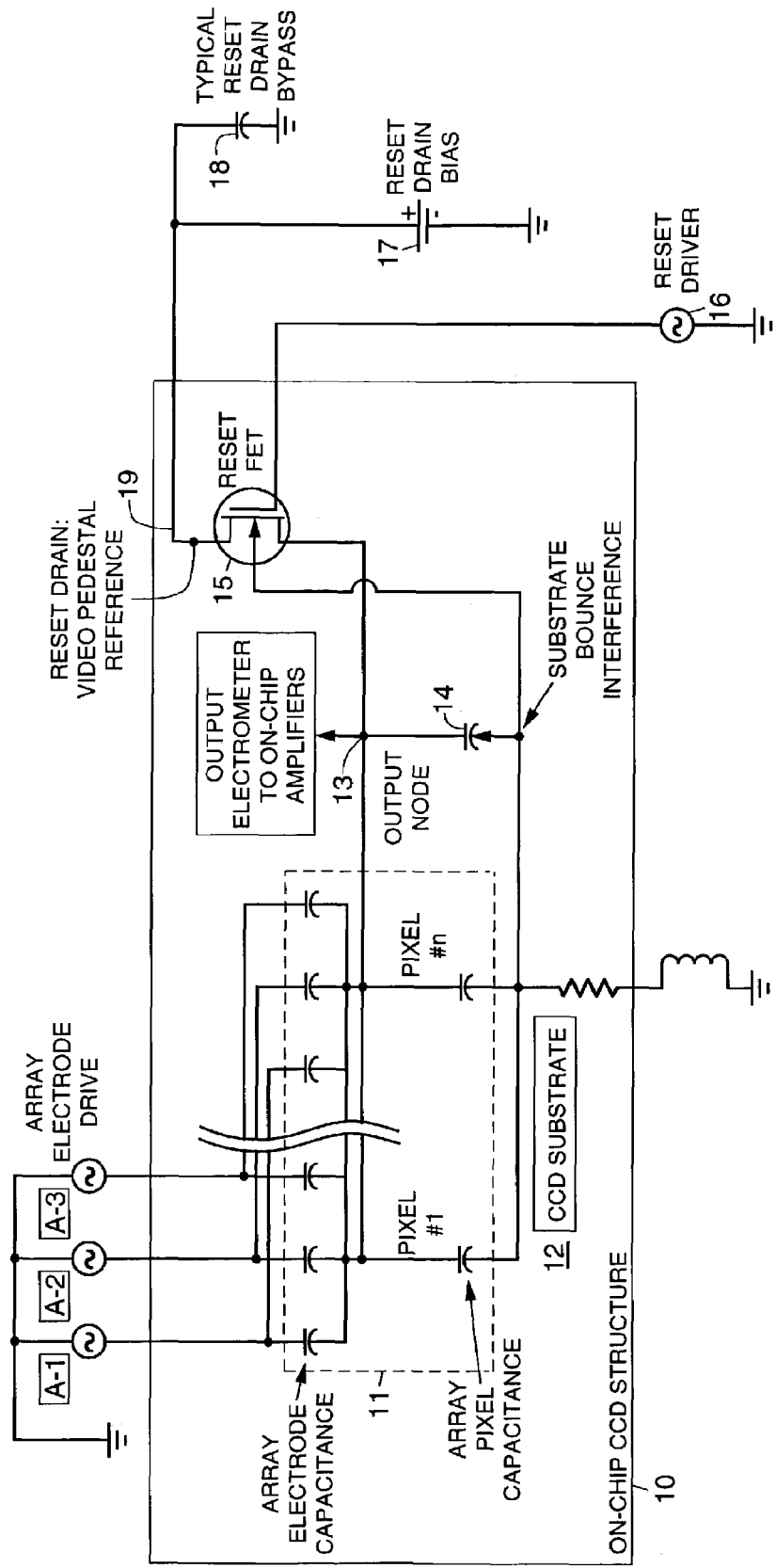
FIG. 3 illustrates a simplified view of a conventional CCD circuit showing substrate bounce interference to the output node.

FIG. 3 illustrates a simplified view of a conventional CCD circuit 10 showing substrate bounce interference to its output node. The conventional CCD circuit 10 comprises a CCD array 11 having an output signal path that is coupled to an electrometer 13 by an output node capacitor 14. The output of the CCD array 11 is coupled to a source input of a reset field effect transistor (FET) 15 through the electrometer side 13 of the output node 14 and to an output amplifier (not shown). A drain input of the reset FET 15 is coupled to a video pedestal reference 19 that includes a drain bias supply 17 and a bypass capacitor 18 wired in parallel. The video pedestal reference voltage 19 provides reset drain bias for the reset FET 15 and the video reference voltage for the output node 13. All of this circuitry can be influenced by the CCD substrate 12 that has complex displacement currents passing through it by the various drivers (parallel drivers shown and serial drivers not shown).

Common practice is to strongly bypass (with the bypass capacitor 18) the reset drain bias 17 thereby providing a stable video pedestal voltage 19. When the reset FET 15 is turned on, this reference is passed through to the output node capacitor 14 on one side with the other side coupled to the CCD substrate 12 and the instantaneous voltage state thereof. In sequence when the reset FET 15 is switched off, isolating the output node and allowing it to be ready to accept pixel charge, the output node voltage and video pedestal are consequently referenced to the last voltage state of the CCD substrate. The node voltage can vary, pixel output to pixel output, because of substrate voltage interference from the parallel drives.

The present inventors have found that the construction of this conventional CCD circuit 10 worsens the interference when both parallel and serial drivers are operating simultaneously, and that the video pedestal voltage 19 should track the parallel interference (substrate bounce) for improved dynamic range performance. The improvement to this circuit that is provided by the present invention is discussed below with reference to FIG. 4.

Figure 4:
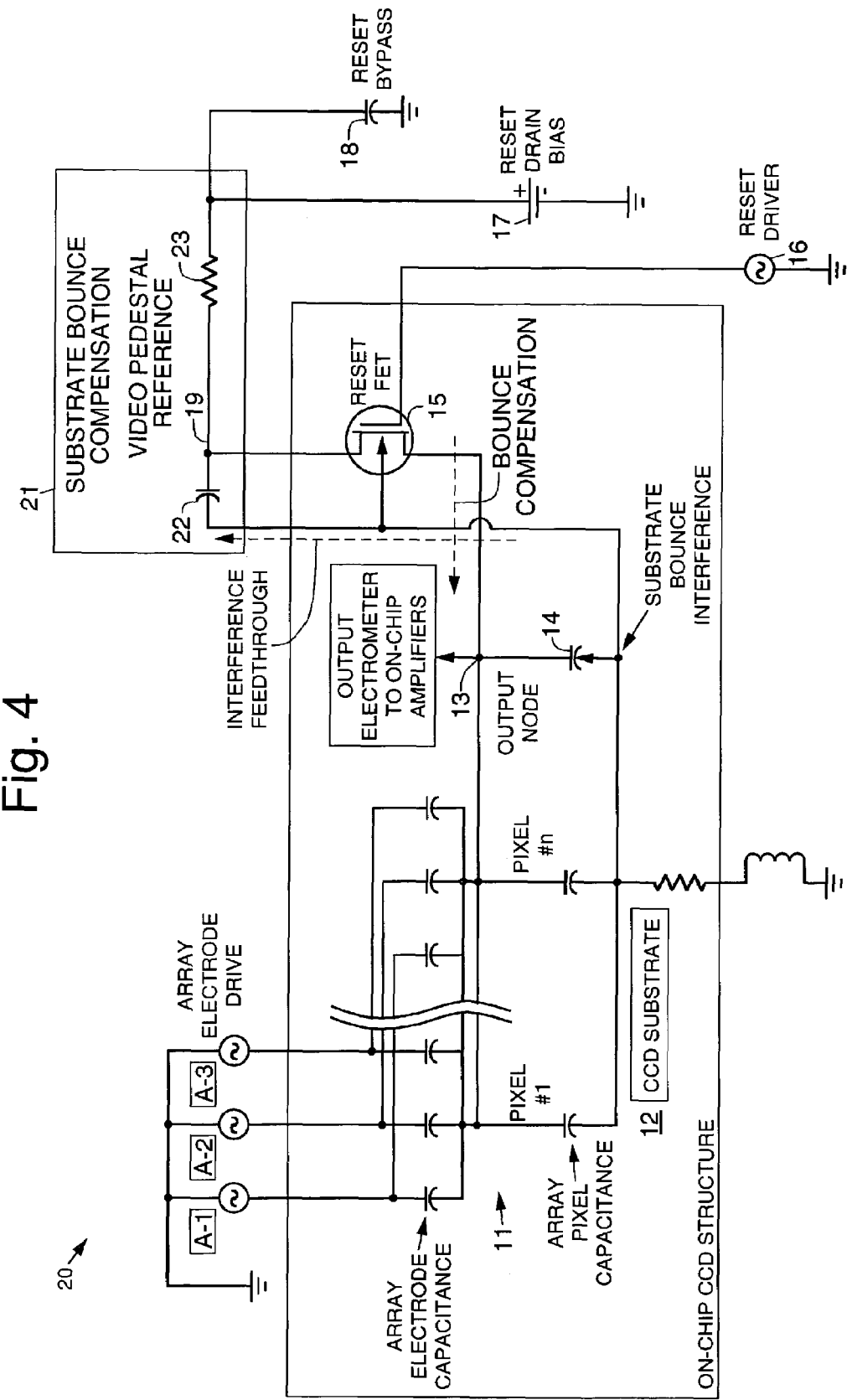
FIG. 4 illustrates a simplified view of a CCD circuit incorporating a substrate electrical bounce compensation circuit in accordance with the principles of the present invention.

Referring to FIG. 4, it illustrates a simplified view of a CCD circuit 20 incorporating a substrate electrical bounce compensation circuit 21 in accordance with the principles of the present invention. The substrate electrical bounce compensation circuitry 21 shown in FIG. 4 causes the output node 13 to track the parallel driver interference (substrate bounce) of the CCD circuit 20, providing improved dynamic range performance.

The improved CCD circuit 20 in accordance with the present invention comprises a CCD array 11 having an output signal path that is coupled to an output electrometer 13 by an output node capacitor 14. The output of the CCD array 11 is coupled through the output node to a source input of a reset field effect transistor (FET) 15. After pixel signal detection this transistor sequentially removes the charge off of the node and resets the node to the reference 19 when in the on state. The FET 15 is then switched off, readying output node 13 for the next pixel signal. A drain input of the reset FET 15 is coupled to a video pedestal reference circuit 19 that includes a drain bias supply 17 and a bypass capacitor 18 wired in parallel. The video pedestal reference voltage 19 provides reset drain bias for the reset FET 15 and the video reference voltage for the output node.

In the improved CCD circuit 20, the output of the CCD array 11 is coupled to a substrate bounce compensation circuit 21 in accordance with the present invention. The substrate bounce compensation circuit 21 includes a capacitor 22 and a resistor 23 that provide a video pedestal reference signal 19 for the output node 13 through the reset FET 15. When the reset FET 15 is turned on the output node 13 is reset to the reference level 19 and also tracks the substrate bounce interference.

Substrate bounce interference is coupled through to reference node 19 by capacitor 22 and drain bias 17 is coupled to reference node 19 by resistor 23 linking both signals to output node 13. The other side of the output node capacitor 14 is directly coupled to the CCD substrate, tracking the interference also.

When the reset FET is turned off, isolating the output node 13, both sides of output node capacitor 14 tracked the interfering substrate bounce, and canceling it, therefore providing a much more repeatable pre-charge on the output node capacitor 14 for detecting pixel signal charge. The substrate bounce compensation circuit 21 is coupled to the substrate 12 by the capacitor 22 with coupling optimized by very close physical proximity to the output 13 environment.

This placement can be "on-chip" but also performs well and is easier to implement "off-chip", as long as the proximity of 21 is physically close to the CCD output environment. In particular, the output of the CCD array 11 and output node 13 are directly coupled to a source of the reset FET 15. The drain of the reset FET 15 is resistively coupled to a reset drain bias supply 17 and bypass capacitor 18 and capacitively coupled to the CCD substrate in close physical proximity to the CCD output.

These elements and couplings form a substrate bounce compensation circuit 21 that stabilizes the video pedestal reference node 19. The substrate bounce compensation circuit 21 and reset drain bias supply 17 provide a dynamically compensated reset drain bias for the reset FET 15 and provides higher dynamic readout of the CCD output.

The present invention uses substrate feedback circuitry to the output node 13 allowing the video pedestal to track and thereby suppress substrate bounce generated through a parallel drive signal that would otherwise cause output signal interference at high frame rates.

The present substrate electrical bounce compensation (or suppressor) circuit 20, shown in FIG. 4, provides approximately 9½ f-stops of exposure latitude (dynamic range) allowing exposures free of interference down to the shot noise level for all but the lowest illumination levels of the CCD array 11.

Figure 5:
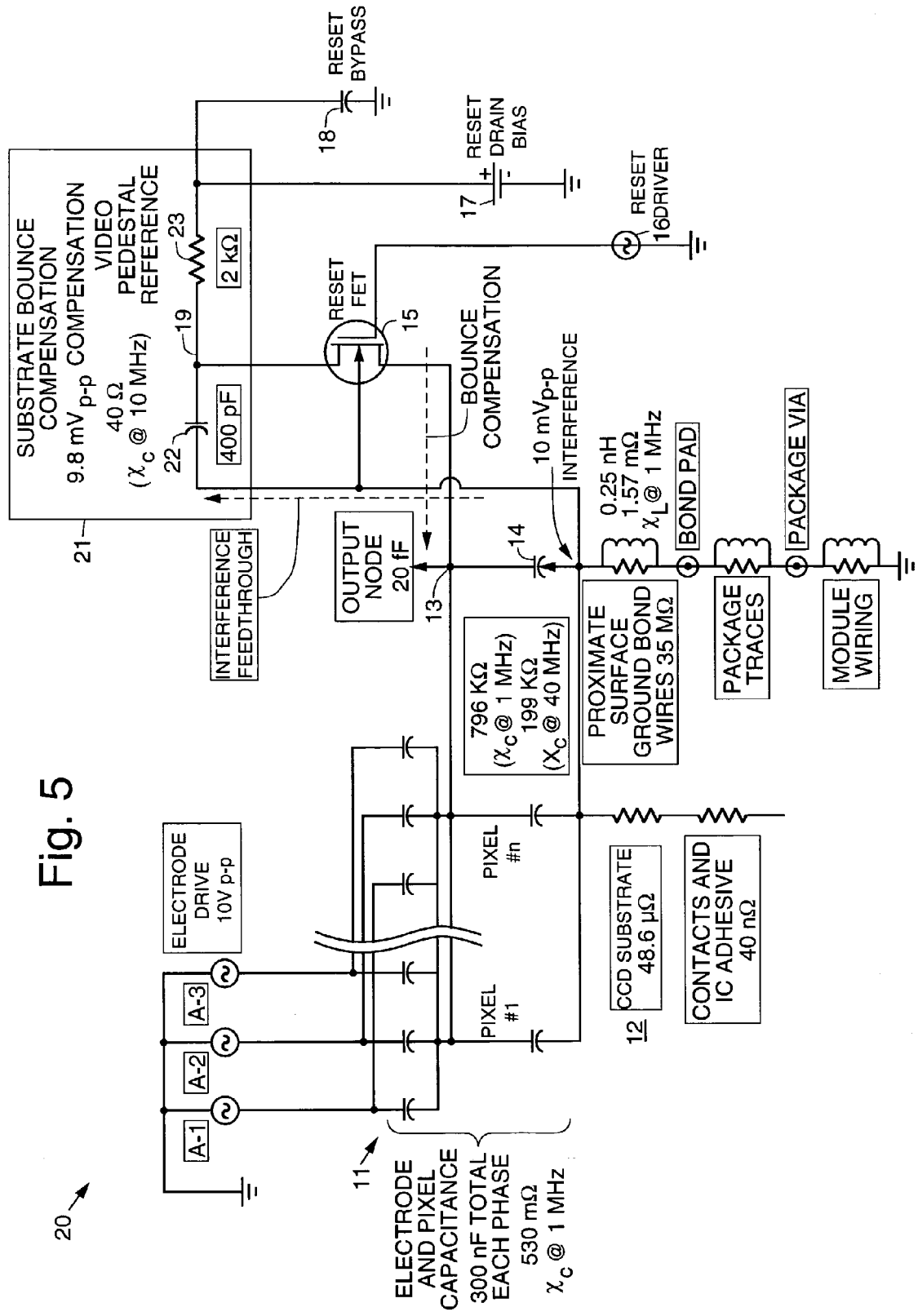
FIG. 5 illustrates exemplary parameters of a reduced-to-practice embodiment of the CCD circuit shown in FIG. 4 employing the present substrate electrical bounce compensation circuitry.

Referring now to FIG. 5, it illustrates exemplary parameters of a reduced-to-practice embodiment of the improved CCD circuit 20 and substrate electrical bounce compensation circuit 21 shown in FIG. 4. Example parameters are shown in FIG. 5, which indicate as much as 10 mV of bounce can occur on the output node. That is only about 40 dB down from 1-volt full-scale video output (approx. 6½ f/stops of illumination latitude and not even below shot noise level at any illumination level).

For example, in the circuit shown in FIG. 5, for 1 volt full scale output and no compensation, substrate bounce interference is typically −40 dBc or greater. Using the compensation circuit 21, substrate bounce is about −74 dBc. Typically, the interference is larger than this example, and achieved compensation is higher than the example. The array drivers operate at 75 KHz with approximately 100 ns rise time in this example. Serial drivers operate at 40 MHz in this example.

Thus, a substrate electrical bounce compensation circuit for use with CCD circuits and cinematography digital image capture cameras has been disclosed. It is to be understood that the described embodiment is merely illustrative of some of the many specific embodiments, which represent applications of the principles of the present invention. Clearly, numerous and other arrangements can be readily devised by those skilled in the art without departing from the scope of the invention.

What is claimed is:

1. A charge coupled device (CCD) circuit comprising:
   a CCD array having a substrate;
   an electrometer coupled to an output of the CCD array having an output node;
   a video pedestal circuit comprising a reset drain bias supply and a reset field effect transistor (FET) having a source input coupled to the output of the CCD array, a source input coupled to the output node, and a drain; and
   a substrate bounce compensation circuit that capacitively couples an output of the CCD array to the drain of the reset FET, and resistively couples the drain of the reset FET to the reset drain bias capacitor to provide reset drain bias for the reset FET.

2. A charge coupled device (CCD) circuit comprising:
a CCD array having a substrate;
an electrometer coupled to an output of the CCD array having an output node;
a video pedestal circuit comprising a reset drain bias supply and a reset field effect transistor (FET) having a source input coupled to the output of the CCD array, a source input coupled to the output node, and a drain; and
a substrate bounce compensation circuit that capacitively couples an output of the CCD array to the drain of the reset FET, and resistively couples the drain of the reset FET to the reset drain bias capacitor to provide reset drain bias for the reset FET;
which video pedestal circuit tracks and suppresses substrate bounce generated through a parallel drive signal that would normally cause output signal interference.

3. A charge coupled device (CCD) circuit comprising:
a CCD array having a substrate;
an electrometer coupled to an output of the CCD array having an output node;
a video pedestal circuit comprising a reset drain bias supply and a reset field effect transistor (FET) having a source input coupled to the output of the CCD array, a source input coupled to the output node, and a drain; and
a substrate bounce compensation circuit that capacitively couples an output of the CCD array to the drain of the reset FET, and resistively couples the drain of the reset FET to the reset drain bias capacitor to provide reset drain bias for the reset FET;
which video pedestal circuit tracks and suppresses substrate bounce generated through a parallel drive signal that would otherwise cause output signal interference at high frame rates.

* * * * *